(12) United States Patent
Smith et al.

(10) Patent No.: US 11,677,840 B2
(45) Date of Patent: Jun. 13, 2023

(54) PRESERVING TRANSMISSION PROPERTIES OF REAL-TIME SCENES IN AN ENVIRONMENT WHEN AN INCREASING NUMBER OF USERS JOIN A SESSION

(71) Applicant: Cisco Technology, Inc., San Jose, CA (US)

(72) Inventors: Malcolm Muir Smith, Richardson, TX (US); Sergio Mena, Saubraz (CH); Lorenzo Granai, Crissier (CH); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 17/146,046

(22) Filed: Jan. 11, 2021

(65) Prior Publication Data
US 2022/0224756 A1 Jul. 14, 2022

(51) Int. Cl.
*H04L 67/143* (2022.01)
*G06V 20/20* (2022.01)
(Continued)

(52) U.S. Cl.
CPC .......... *H04L 67/143* (2013.01); *G06T 19/006* (2013.01); *G06V 20/20* (2022.01);
(Continued)

(58) Field of Classification Search
CPC ... H04L 67/143; H04L 67/141; H04L 65/612; H04L 65/80; G06T 19/006; G06T 2210/36; G06T 2210/61; G06T 2219/024; G06V 20/20; H04N 21/2385; H04N 21/2585; H04N 21/816; H04N 21/234327; H04N 21/2396; H04N 21/2402; H04N 21/41407;
(Continued)

(56) References Cited

U.S. PATENT DOCUMENTS

2011/0077042 A1* 3/2011 Stanforth .............. H04W 16/14
455/512
2018/0089903 A1* 3/2018 Pang .................... H04N 13/161
(Continued)

FOREIGN PATENT DOCUMENTS

WO 2018175855 A1 9/2018
WO 2019157448 A1 8/2019

OTHER PUBLICATIONS

Bankov, Dmitry et al. "OFDMA Uplink Scheduling in IEEE 802.11ax Networks", ResearchGate, May 2018.
(Continued)

*Primary Examiner* — Jitesh Patel
(74) *Attorney, Agent, or Firm* — Merchant & Gould P.C.

(57) ABSTRACT

Preserving transmission properties of real-time scenes in an environment when an increasing number of users join a session may be provided. A plurality of metrics associated with transmission of scenes having a Coarse Grain (CG) layer and a Fine Grain (FG) layer may be determined. Then a current client, based on a first one of a plurality of metrics, may be revoked. One of the following may then be performed: blocking a new client based on a second one of a plurality of metrics; and allowing the new client based on the second one of a plurality of metrics.

20 Claims, 3 Drawing Sheets

(51) Int. Cl.
*H04L 67/141* (2022.01)
*G06T 19/00* (2011.01)

(52) U.S. Cl.
CPC ........ *H04L 67/141* (2013.01); *G06T 2210/36* (2013.01); *G06T 2210/61* (2013.01); *G06T 2219/024* (2013.01)

(58) Field of Classification Search
CPC .......... H04N 21/43637; H04N 21/631; H04N 21/64738; H04N 21/814
See application file for complete search history.

(56) References Cited

U.S. PATENT DOCUMENTS

| | | |
|---|---|---|
| 2018/0359189 A1 | 12/2018 | Ye et al. |
| 2019/0250805 A1 | 8/2019 | Brewer et al. |
| 2019/0297535 A1 | 9/2019 | Andreoli-Fang et al. |
| 2019/0318065 A1* | 10/2019 | Brent .................... G06F 21/121 |
| 2020/0137622 A1 | 4/2020 | Vlachou et al. |

OTHER PUBLICATIONS

Jahromi Hamed Z et al: "Towards Application-Aware Networking: ML-Based End-to-End Application KPI/QoE Metrics Characterization in SDN", 2018 Tenth International Conference on Ubiquitous and Future Networks (ICUFN), IEEE, Jul. 3, 2018, pp. 126-131.
International Search Report and Written Opinion issued in corresponding International Patent Application No. PCT/US2022/011694, dated Apr. 26, 2022.

* cited by examiner

PRESERVING TRANSMISSION PROPERTIES OF REAL-TIME SCENES IN AN ENVIRONMENT WHEN AN INCREASING NUMBER OF USERS JOIN A SESSION

TECHNICAL FIELD

The present disclosure relates generally to preserving transmission properties of real-time scenes.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
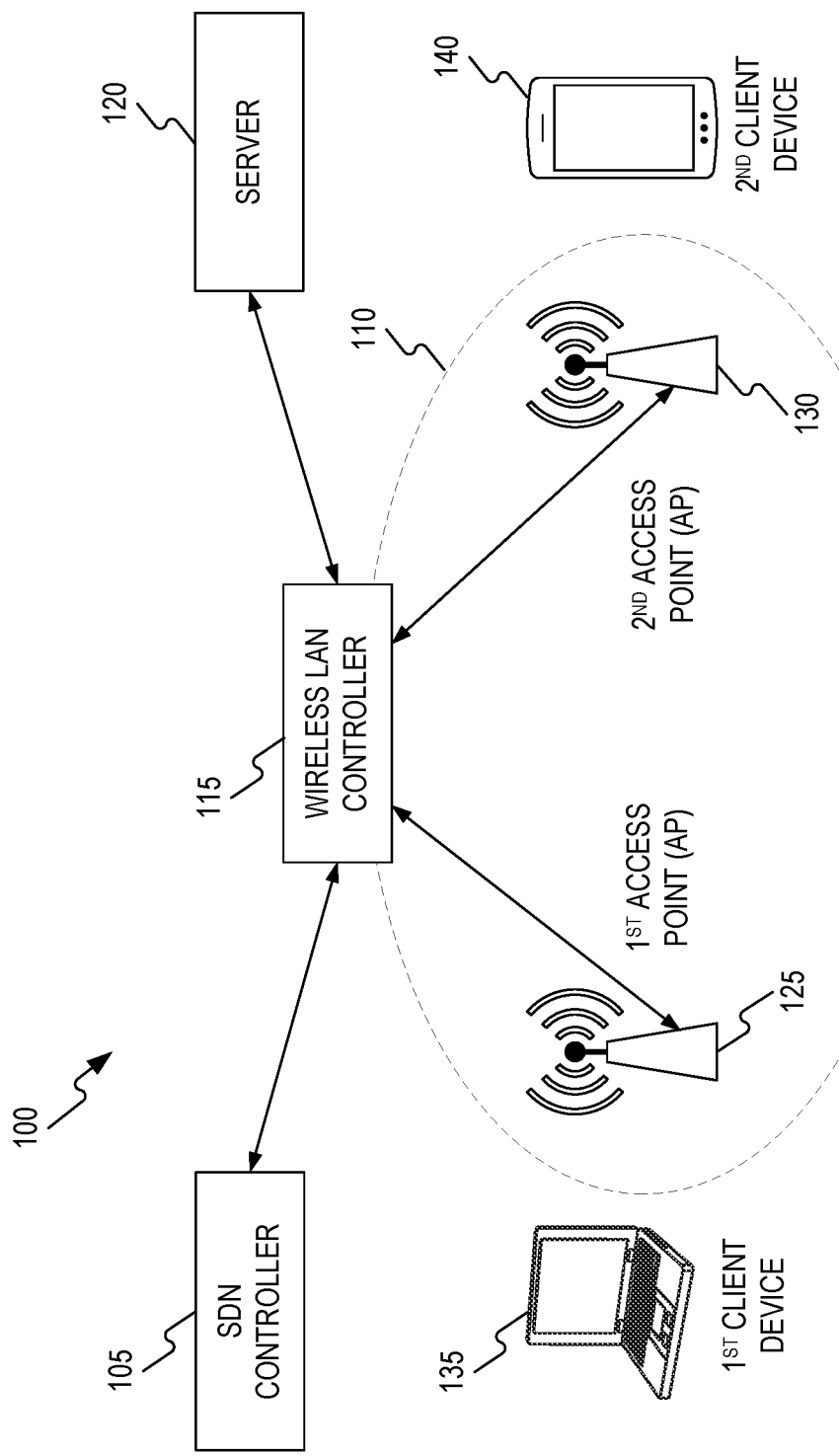
FIG. 1 is a block diagram of an operating environment for preserving transmission properties of real-time scenes in an environment when an increasing number of users join a session.

Preserving transmission properties of real-time scenes in an environment when an increasing number of users join a session may be provided. A plurality of metrics associated with transmission of scenes having a Coarse Grain (CG) layer and a Fine Grain (FG) layer may be determined. Then a current client, based on a first one of a plurality of metrics, may be revoked. One of the following may then be performed: blocking a new client based on a second one of a plurality of metrics; and allowing the new client based on the second one of a plurality of metrics.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Virtual Reality (VR) or Augmented Reality (AR) applications may divide real-time scene data they transmit and receive into subscenes. One property of data transmission for VR or AR applications may be the synchronous transmission of related subscenes. WiFi6 (i.e., 802.11ax) may offer a process to improve such synchronous transmission, namely Orthogonal Frequency Division Multiple Access (OFDMA) and its flexibility to schedule Resource Units (RUs) to fit related subscenes in a given Transmit Opportunity (TXOP).

OFDMA may take a Wi-Fi channel and divide it into smaller frequency allocations (i.e., RUs). This enables an Access Point (AP) to communicate with multiple client devices by assigning them to specific RUs, for example, within one TXOP. Also, by subdividing the channel, applications that use small frames, such as video or audio streaming, can be transmitted to multiple endpoints simultaneously, which may cut down on overhead and congestion at layer two, improving application performance. OFDMA may be flexible and may allocate a channel to a single client or sub-divide the channel for multiple clients depending on traffic.

At scale (i.e., many wireless VR/AR client devices), there may not be enough available time-frequency RUs to send all VR/AR subscene update data in the same TXOP. If this happens, some subscene updates may be sent in a later TXOP, which may adversely affecting synchronicity. The may result is a choppy experience for some users.

Real time multi-user VR/AR applications may need a process to preserve the transmission properties when an ever-increasing number of users join a VR or AR session. Accordingly, embodiments of the disclose may preserve transmission properties of real-time AR/VR scenes, for example, in an OFDMA Wi-Fi6/7 environment when an increasing number of users join a session. Consequently, embodiments of the disclosure may limit the number of users by using clear, fair criteria, for example, on a current system load. Embodiments of the disclosure may also detect and exclude VR/AR users that may not be fair in their usage of RUs. Moreover, embodiments of the disclosure may be used on top of Binary Format for Scenes (BIFS), Lightweight Application Scene Representation (LASeR), other standard video formats, or future standardized video formats.

FIG. 1 shows an operating environment 100 for preserving transmission properties of real-time scenes in an environment when an increasing number of users join a session.

As shown in FIG. 1, operating environment 100 may comprise a Software-Defined Network (SDN) controller 105, a Wireless Local Area Network (WLAN) 110, a WLAN controller 115, and a server 120. WLAN 110 may comprise a first Access Point (AP) 125 and a second AP 130. First AP 125 may provide wireless network access (e.g., access to WLAN 110) for devices such as a first client device 135. Similarly, second AP 130 may provide wireless network access (e.g., access to WLAN 110) for devices such as a second client device 140. Operating environment 100 may include more client devices other than first client device 135 and second client device 140 and is not limited to two client devices. In other embodiments of the disclosure, server 120 may connect directly with SDN controller 105 in order to learn the usage of the VR/AR flow (e.g. FG verses CG statistics), for example, if the link from the client device to video server is encrypted. Another example may be to receive the scene requests for one or more subscenes as discussed below.

First client device 135 and second client device 140 may comprise, but is not limited to, a smart phone, a personal computer, a tablet device, a mobile device, a cable modem, a cellular base station, a telephone, a remote control device, a set-top box, a digital video recorder, an Internet-of-Things (IoT) device, a network computer, a mainframe, a router, or other similar microcomputer-based device. First AP 125 and second AP 130 may be compatible with specification standards such as the 802.11ax specification standard for example. First client device 135 and second client device 140 may comprise or otherwise be used in conjunction with a VR headset and/or an AR headset. The VR headset and the AR headset may comprise a head-mounted device that may provide virtual reality and/or augmented reality for the wearer (i.e., user). They may comprise a stereoscopic Head-Mounted Display (HMD) that may provide separate images for each eye, stereo sound, and head motion tracking sensors that may include gyroscopes, accelerometers, magnetometers, structured light systems etc. Some VR/AR headsets may also include eye tracking sensors and gaming controllers.

WLAN controller 115 may provision and control WLAN 110. WLAN controller 115 may allow first AP 125 and second AP 130 to join WLAN 110. SDN controller 105 may be implemented by a Digital Network Architecture Center (DNAC) controller that may configure information for WLAN 110 in order to preserve transmission properties of real-time scenes in an environment when an increasing number of users join a session.

Server 120 may comprise a Virtual Reality (VR) server and/or an Augmented Reality (AR) server. Server 120 may serve (i.e., stream VR or AR subscenes to client devices (e.g., first client device 135 and second client device 140) in conjunction with a VR or AR application.

The elements described above of operating environment 100 (e.g., SDN controller 105, WLAN controller 115, server 120, first AP 125, second AP 130, first client device 135, and second client device 140) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
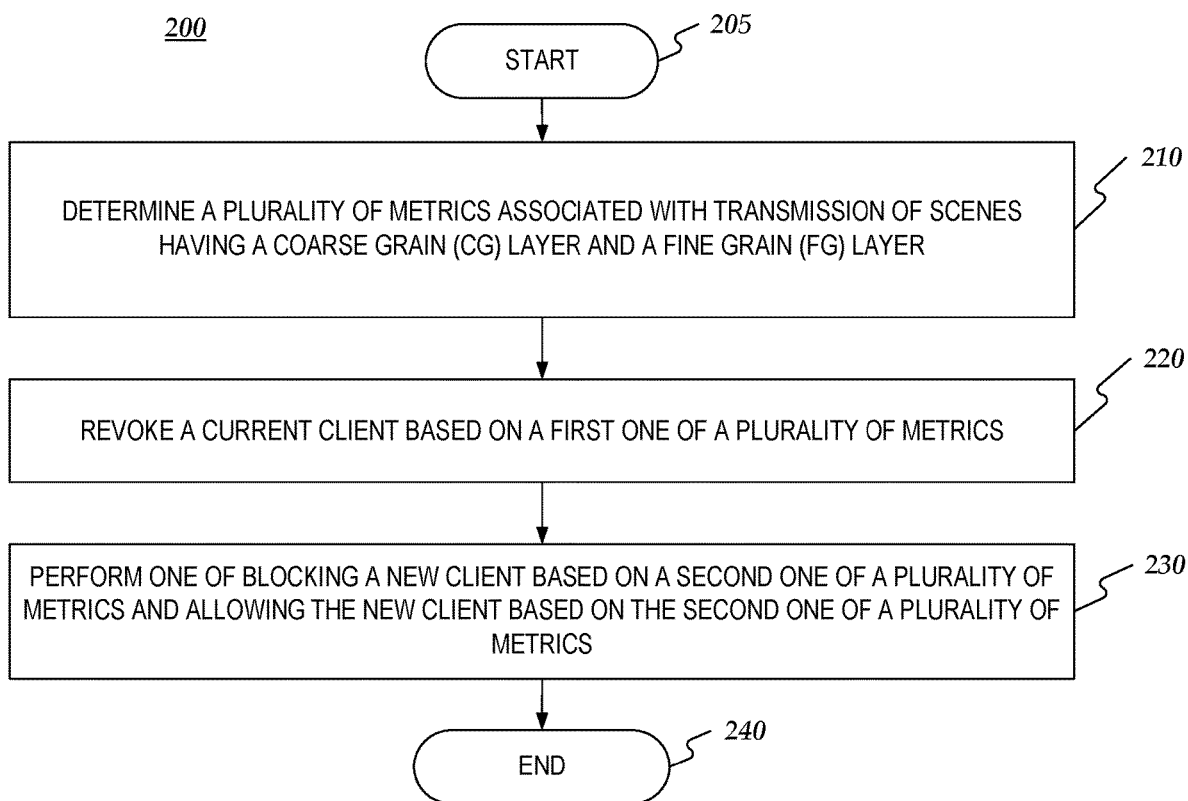
FIG. 2 is a flow chart of a method for preserving transmission properties of real-time scenes in an environment when an increasing number of users join a session.

FIG. 2 is a flow chart setting forth the general stages involved in a method 200 consistent with an embodiment of the disclosure for preserving transmission properties of real-time scenes in an environment when an increasing number of users join a session. Method 200 may be implemented by SDN controller 105 that may be embodied by a computing device 300 as described in more detail below with respect to FIG. 3. Method 200 may be implemented by other devices within or outside of operating environment 100. Ways to implement the stages of method 200 will be described in greater detail below.

In a VR/AR system, client devices may subscribe for scenes, which may consist of one or more subscenes. Subscene rendering may depend, for example, on the base X3D model (polygon count, size (resolution), textures, color depth, etc.) received from the VR/AR server and the updates produced by client devices when interacting with the model (e.g., frequency of updates and impact of the action on the scene/subscene). In other embodiments, subscene rendering may be proprietary in nature and may rely on implicit subscene selection based, for example, on HMD (e.g., associated with client devices) tracking info exchanged with server 120 (i.e., VR server).

Embodiments of the disclosure may use a layering process. For example, a user may move a VR/AR object from point A to point B. The object's movement may need to be represented on all VR/AR headsets (e.g., associated with client devices) watching the action. The scene updates generated by such action may be more or less precise and fine grained, depending for example, on how many points use to represent a trajectory, how many decimals, and how many polygons are represented during the movement. For example, a DELTA (in time, or in space) may be configured between consecutive points, in order to describe the movement's trajectory, resulting in more or less points. A big DELTA (DELTA coarse) may describe the trajectory roughly, and a small DELTA (DELTA fine) may improve the precision of the rough trajectory. The floating-point precision of Euclidean coordinates (whether absolute or relative) of the movement's trajectory points may be configured. Thus, a limited number of decimals (e.g., rough, coarse) may be set up, which can be fine-tuned by adding a higher precision term (fine).

Embodiments of the disclosure may divide the VR/AR data into two layers, for example, a Coarse Grain (CG) layer and a Fine Grain (FG) layer such that CG plus FG may equal a full scene. Furthermore, embodiments of the disclosure may guarantee that the CG layer traffic of all current users may be scheduled in a current TXOP. Thus CG layer traffic may receive preferential treatment. The FG layer may provide improved quality (e.g., precision). The same layering may be applied to scene updates from the VR/AR server (e.g., more or less polygons, texture quality, etc.). The CG layer may benefit from strong, synchronous delivery properties, whereas the FG layer's synchronous delivery may be best-effort.

A plurality of APs (e.g., first AP 125 and second AP 130) may be managed by WLAN controller 115. SDN controller 105 may monitor the network, including the wireless subsystem (e.g., WLAN 110). Wireless clients (e.g., first client device 135 and second client device 140) may share a VR/AR session managed by a VR server (e.g., server 120), which may stream subscene information.

If a new client device wishes to join the AR/VR session, it may send a request to SDN controller 105 for one or more subscenes. With embodiments of the disclosure, SDN controller 105 (or server 120) may act as a proxy between the client devices and server 120. If SDN controller 105 grants access, SDN controller 105 may reply with allocated subscene_ids for the subscenes requested. With a valid subscene_id, a client may obtain CG layer treatment for its traffic.

With embodiments of the disclosure, SDN controller 105 may implement the division between CG layer and FG layer of VR/AR scenes. The CG layer may benefit from strong, synchronous delivery properties, whereas the FG layer's synchronous delivery may be best-effort. SDN controller 105 may receive detailed Deep Packet Inspection (DPI) data from WLAN controller 115 and/or APs and/or server 120 so the scene requests may be understood. With this data, SDN controller 105 may build a "ranking table" with the size that each client device's/scene's CG and FG layers are taking in a current TXOP.

Method 200 may begin at starting block 205 and proceed to stage 210 where computing device 300 may determine a plurality of metrics associated with transmission of scenes having a CG layer and a FG layer. For example, the plurality of metrics may comprise, but are not limited to, Time Since Top User (TSTU), Average CG Layer Size (ACGLS), CG/FG Layer Ratio (LR), Average CG/FG Layer Ratio (ALR), and RU per TXOP (CG) (RUT-CG). TSTU may be applied to the client device/scene that currently tops the ranking table and denotes how many seconds may have elapsed since the top client device/scene reached that top rank. ACGLS may comprise the sum of the CG layer size in bytes (for the current TXOP) of all client devices/scenes divided by the number of client devices/scenes. This value may be smoothed out over time by applying an Exponential Moving Average (EMA). LR, for a given client, may comprise the size of its current CG layer divided by the size of its current FG layer (for the current TXOP). A bigger LR may mean better Quality of Experience (QoE), as a bigger proportion of its traffic may be shipped on the CG layer. ALR may comprise the average LR over all clients for the current TXOP. RUT-CG may comprise the average number of RUs (e.g., 26-tone chunks) allocated to CG scenes in each synchronous TXOP for each client device (e.g., those allocated to the AR/VR function in this example).

At the beginning, one or more client devices (e.g., first client device 135 and second client device 140) may request VR/AR scenes, which may comprise geometric constructs. The scenes may be transmitted by server 120 over operating environment 100 and rendered at the client devices. This may continue until N VR/AR scenes are rendered. N may be configurable and may match a target Channel Utilization (CU) level, a maximum video volume level, or any other metric relevant to QoE control.

Each time VR/AR scenes are transmitted and rendered, computing device 300 (e.g., SDN controller 105) may measure TSTU, ACGLS, ALR, and RUT-CG/FG using the latest data obtained from WLAN controller 115 and/or the APs (e.g., first AP 125 and second AP 130). A scheduler in each of the APs may be allocating RU's in the synchronous TXOP based on client device demand (i.e., it may not be pre-allocated/assigned).

From stage 210, where computing device 300 determines the plurality of metrics associated with the transmission of scenes having the CG layer and the FG layer, method 200 may advance to stage 220 where computing device 300 may revoke a current client based on a first one of the plurality of metrics. For example, if the measured TSTU is greater than a maximum TSTU value (e.g., max_tstu), then computing device 300 (e.g., SDN controller 105) may examine a client list that lists the client devices currently in the VR/AR session, identify a new consumer (e.g., by the client device/scene at the top of the ranking table), and revoke transmit/receive permissions for that client device and scene pair. TSTU value (e.g., max_tstu) may denote the maximum time in seconds that a client device/scene may top the ranking table. Its purpose may be to prevent a given user from abusing the system resources. Fair client devices may be expected to throttle the contents of their CG layer when they are notified they top the ranking table. As a result, a client device that stays on top of the ranking table for more than max_tstu seconds may not be behaving fairly and may be blocked (i.e., revoked). FG scene traffic may be best-effort. When a client device is revoked, it may no longer send CG traffic, which is the layer that is to be protected. If a client device is making excessive use of CG traffic, this abuse may be corrected/prevented.

Once revoked, the client device's/scene's traffic may no longer get CG-layer treatment. The effect may be that all other client devices that are already receiving the scenes may continue to have a detailed polygon structure (i.e., optimal VR/AR experience), however the new client may receive a lower polygon resolution (e.g., from the FG layer resulting in a more grainy VR/AR scene as a direct consequence, but with the benefit on maintaining the other client devices' experience).

Embodiments of the disclosure may also allow this evaluation to be smoothed over time. For example the trend (i.e., RU usage, video volume in the cell etc.) over x seconds may be taken into account to decide triggering action. This precaution may ensure that the new client device experience may stay acceptable, for example, not a choppy alternation of scenes with high quality then scenes with low quality, but rather a gentle degradation, which may be less perceivable than sudden visual changes.

Once computing device 300 revokes the current client based on the first one of a plurality of metrics in stage 220, method 200 may continue to stage 230 where computing device 300 may perform one of blocking a new client based on a second one of a plurality of metrics and allowing the new client based on the second one of the plurality of metrics. For example, if the measured ACGLS is less than a minimum ACGLS value (e.g., min_agls) or if the measured ALR is less than the minimum ALR value (e.g., min_alr), then new client device/scene allocations may be blocked. New client devices/scenes may no longer receive scene_id's with the minimum admission criteria of at least CG-layer treatment. Embodiments of the disclosure may prevent excessive client devices from destroying the experience of all client devices. If the measured ACGLS is greater than or equal to the minimum ACGLS value (e.g., min_agls) or if the measured ALR is greater than or equal to the minimum ALR value (e.g., min_alr), then new client device/scene allocations may be resumed and new client deices/scenes may be able to obtain scene_id's with CG-layer treatment. Consistent with embodiments of the disclosure, stage 230 may happen every time a client device tries to join the session. However, stage 220 may happen periodically. After computing device 300 performs one of blocking the new client based on the second one of a plurality of metrics and allowing the new client based on the second one of the plurality of metrics in stage 230, method 200 may then end at stage 240.

Figure 3:
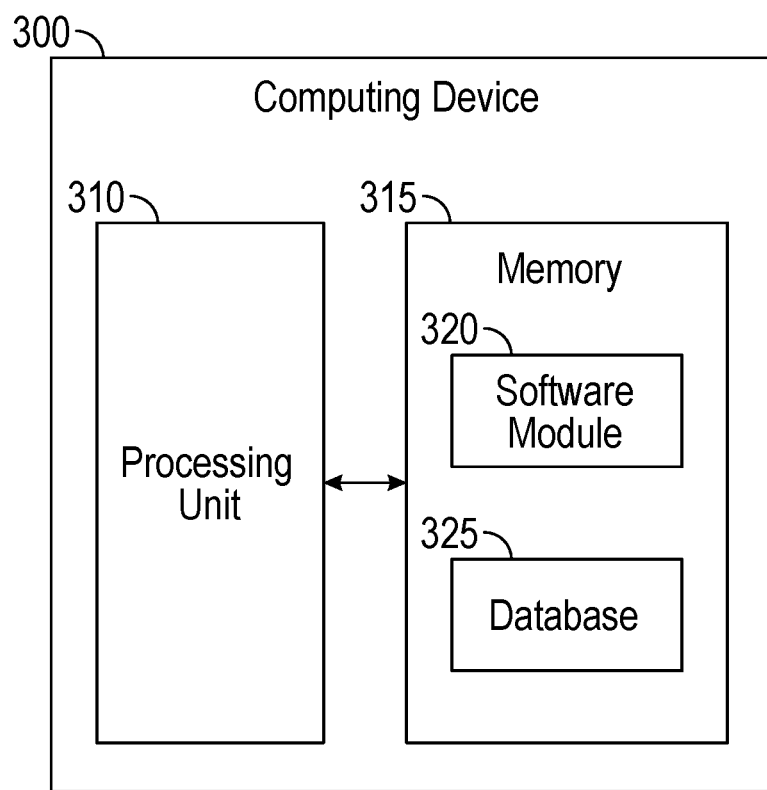
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for preserving transmission properties of real-time scenes in an environment when an increasing number of users join a session as described above with respect to FIG. 2. Computing device 300, for example, may provide an operating environment for SDN controller 105, WLAN controller 115, server 120, first AP 125, second AP 130, first client device 135, and second client device 140. SDN controller 105, WLAN controller 115, server 120, first AP 125, second AP 130, first client device 135, and second client device 140 may operate in other environments and are not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining, by a computing device, a plurality of metrics associated with transmission of scenes having a Coarse Grain (CG) layer and a Fine Grain (FG) layer;

revoking a current client based on a first one of the plurality of metrics; and performing one of;
   blocking a new client based on a second one of the plurality of metrics, and
   allowing the new client based on the second one of the plurality of metrics wherein the first one of the plurality of metrics comprises a Time Since Top User (TSTU) and wherein the second one of the plurality of metrics comprises one of an Average Coarse Grain Layer Size (ACGLS) and an Average Layer Ratio (ALR).

2. The method of claim 1, wherein the scenes comprise one of Augmented Reality (AR) scenes and Virtual Reality (VR) scenes.

3. The method of claim 1, wherein revoking the current client based on the first one of the plurality of metrics comprises revoking the current client when the first one of the plurality of metrics is greater than a maximum TSTU value.

4. The method of claim 1, wherein blocking the new client based on the second one of the plurality of metrics comprises blocking the new client when the second one of the plurality of metrics, comprising the ACGLS, is less than a minimum ACGLS value.

5. The method of claim 1, wherein blocking the new client based on the second one of the plurality of metrics comprises blocking the new client when the second one of the plurality of metrics, comprising the ALR, is less than a minimum ALR value.

6. The method of claim 1, wherein allowing the new client based on the second one of the plurality of metrics comprises allowing the new client when the second one of the plurality of metrics, comprising the ACGLS, is one of greater than a minimum ACGLS value and equal to the minimum ACGLS value.

7. The method of claim 1, wherein allowing the new client based on the second one of the plurality of metrics comprises allowing the new client when the second one of the plurality of metrics, comprising the ALR, is one of greater than a minimum ALR value and equal to the minimum ALR value.

8. A system comprising:
   a memory storage; and
   a processing unit coupled to the memory storage, wherein the processing unit is operative to:
      determine a plurality of metrics associated with transmission of scenes having a Coarse Grain (CG) layer and a Fine Grain (FG) layer;
      revoke a current client based on a second one of the plurality of metrics when the second one of the plurality of metrics, comprising a Time Since Top User (TSTU), is greater than a maximum TSTU value; and
      perform one of;
         block a new client based on a first one of the plurality of metrics, and
         allow the new client based on the first one of the plurality of metrics.

9. The system of claim 8, wherein the scenes comprise one of Augmented Reality (AR) scenes and Virtual Reality (VR) scenes.

10. The system of claim 8, wherein the first one of the plurality of metrics comprises one of an Average Coarse Grain Layer Size (ACGLS) and an Average Layer Ratio (ALR).

11. The system of claim 8, wherein the processing unit being operative to block the new client based on the first one of the plurality of metrics comprises the processing unit being operative to block the new client when the first one of the plurality of metrics, comprising an Average Coarse Grain Layer Size (ACGLS), is less than a minimum ACGLS value.

12. The system of claim 8, wherein the processing unit being operative to block the new client based on the first one of the plurality of metrics comprises the processing unit being operative to block the new client when the first one of the plurality of metrics, comprising an Average Layer Ratio (ALR), is less than a minimum ALR value.

13. The system of claim 8, wherein the processing unit being operative to allow the new client based on the first one of the plurality of metrics comprises the processing unit being operative to allow the new client when the first one of the plurality of metrics, comprising an Average Coarse Grain Layer Size (ACGLS), is one of greater than a minimum ACGLS value and equal to the minimum ACGLS value.

14. The system of claim 8, wherein the processing unit being operative to allow the new client based on the first one of the plurality of metrics comprises the processing unit being operative to allow the new client when the first one of the plurality of metrics, comprising an Average Layer Ratio (ALR), is one of greater than a minimum ALR value and equal to the minimum ALR value.

15. A non-transitory computer-readable medium that stores a set of instructions which when executed performs a method comprising:
   determining, by a computing device, a plurality of metrics associated with transmission of scenes having a Coarse Grain (CG) layer and a Fine Grain (FG) layer;
   revoking a current client based on a first one of the plurality of metrics; and
   performing one of;
      blocking a new client based on a second one of the plurality of metrics, and
      allowing the new client based on the second one of the plurality of metrics wherein the first one of the plurality of metrics comprises a Time Since Top User (TSTU) and wherein the second one of the plurality of metrics comprises one of an Average Coarse Grain Layer Size (ACGLS) and an Average Layer Ratio (ALR).

16. The non-transitory computer-readable medium of claim 15, wherein revoking the current client based on the first one of the plurality of metrics comprises revoking the current client when the first one of the plurality of metrics is greater than a maximum TSTU value.

17. The non-transitory computer-readable medium of claim 15, wherein blocking the new client based on the second one of the plurality of metrics comprises blocking the new client when the second one of the plurality of metrics, comprising the ACGLS, is less than a minimum ACGLS value.

18. The non-transitory computer-readable medium of claim 15, wherein blocking the new client based on the second one of the plurality of metrics comprises blocking the new client when the second one of the plurality of metrics, comprising the ALR, is less than a minimum ALR value.

19. The non-transitory computer-readable medium of claim 15, wherein allowing the new client based on the second one of the plurality of metrics comprises allowing the new client when the second one of the plurality of metrics, comprising the ACGLS, is one of greater than a minimum ACGLS value and equal to the minimum ACGLS value.

20. The non-transitory computer-readable medium of claim 15, wherein allowing the new client based on the second one of the plurality of metrics comprises allowing the new client when the second one of the plurality of metrics, comprising the ALR, is one of greater than a minimum ALR value and equal to the minimum ALR value.

* * * * *